United States Patent [19]

Matsuda

[11] 4,215,453
[45] Aug. 5, 1980

[54] NET JOINTING STRUCTURE

[75] Inventor: Yoshio Matsuda, Nyuzen, Japan

[73] Assignee: Yoshida Kogyo K.K., Tokyo, Japan

[21] Appl. No.: 939,666

[22] Filed: Sep. 5, 1978

Related U.S. Application Data

[63] Continuation of Ser. No. 796,840, May 13, 1977, abandoned.

[30] Foreign Application Priority Data

May 18, 1976 [JP] Japan .................................. 51-57041

[51] Int. Cl.² ............................................ A44B 19/00
[52] U.S. Cl. ................................ 24/205.16 C; 66/195
[58] Field of Search ..................... 428/99; 66/190, 191, 66/192, 193, 194, 195; 24/205.16 R, 205.16 C

[56] References Cited

U.S. PATENT DOCUMENTS

| | | | |
|---|---|---|---|
| 550,304 | 11/1895 | Ward | 66/193 |
| 1,139,343 | 5/1915 | Clewley | 66/193 |
| 2,996,905 | 8/1961 | Scheibe | 66/192 |
| 3,118,294 | 1/1964 | Van Laethem | 66/193 |
| 3,171,272 | 3/1965 | Frith | 66/195 |
| 3,242,699 | 4/1966 | Momoi | 66/193 |
| 4,019,227 | 4/1977 | Ebata | 66/195 X |
| 4,044,432 | 8/1977 | Ebata | 24/205.16 |

Primary Examiner—Ronald Feldbaum
Attorney, Agent, or Firm—Bucknam and Archer

[57] ABSTRACT

A net jointing structure has a pair of warp-knitted net adapters for use in coupling or jointing confronting net ends together. Each of the adapters has a net region and a web region, the net region being subdivided into a plurality of net sections which are formed of a plurality of meshes made of warp chains and are progressively smaller in mesh size. The net section of the smallest mesh size is coupled to the web region and the net section of the largest mesh size is adapted for connection with one of the net ends. The web region carries a stringer of a sliding clasp fastener and includes a plurality of warp chains uniformly spaced along the length thereof, the warp chains in the web region being extensions of the warp chains in the net region. Inlaid threads are included in the net region where they run in and along the warp chains and in the web region where they extend coursewise across and over several warp chains to keep them in uniformly spaced relation to each other.

1 Claim, 6 Drawing Figures

NET JOINTING STRUCTURE

This is a continuation, of application Ser. No. 796,840, filed May 13, 1977.

BACKGROUND OF THE INVENTION

1. Field of the Invention

The present invention relates to a net jointing structure having a pair of knitted net adapters for use in coupling or jointing net ends together by means of a sliding clasp fastener.

2. Description of the Prior Art

There are certain instances where it is necessary to joint two or more nets together so as to provide an elongate combination net. For example, it is customary in the round haul net fishery for a pair of fishing boats to carry identical halves of a round haul net, respectively, and then interconnect the net halves at a fishing ground. The conventional practice of coupling and uncoupling the net halves together has been to knot and unknot the confronting edges of the halves. This procedure is however an extremely tedious and time-consuming task.

In order to solve the foregoing problem, a net jointing structure has been proposed which has a sliding clasp fastener for separably jointing or coupling a pair of nets together (U.S. Ser. NO. 665,707 filed Mar. 11, 1976).

According to another net jointing structure (U.S. Ser. No. 727,797 filed Sept. 29, 1976 and now U.S. Pat. No. 4,056,868), the details of a warp-knitted net fabric have been disclosed. The present invention relates specifically to an improvement over the warp-knitted net jointing structure of the later application.

SUMMARY OF THE INVENTION

A principal object of the present invention is to provide a net jointing structure to which a sliding clasp fastener stringer can be fixed with utmost ease.

Another object of the present invention is to provide a net jointing structure which will prevent an attached sliding clasp fastener stringer from getting puckered or otherwise deformed.

Still another object of the present invention is to provide a net jointing structure which can hold an attached sliding clasp fastener stringer stably in place and permit the sliding clasp fastener to function reliably.

According to the invention, a web region of each warp-knitted net jointing adapter along which a stringer of a sliding clasp fastener is supported has a plurality of warp chains extending into a net region as its net legs, the warp chains being uniformly spaced from each other in the web region by means of symmetrically running two kinds of inlaid yarn each extending coursewise across and over four wales of warp chains.

Other objects of the invention will be apparent when reading the following detailed description in connection with the accompanying drawings.

DESCRIPTION OF THE PREFERRED EMBODIMENT

Figure 1:
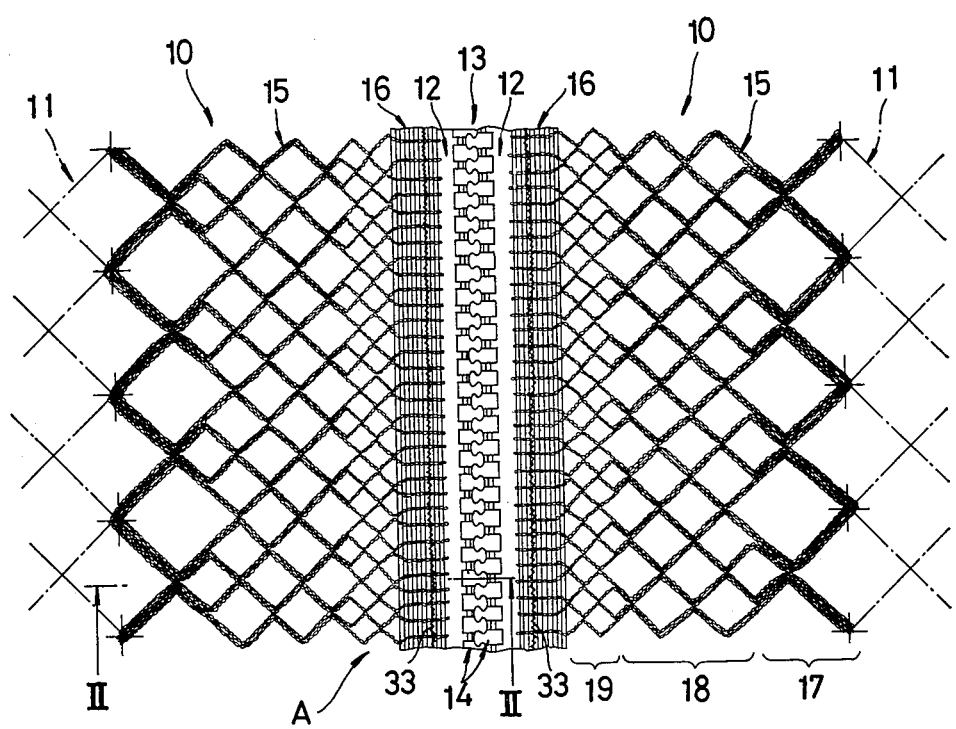
FIG. 1 is a plan view of a net jointing structure having a pair of knitted net adapters with a sliding clasp fastener therebetween jointing confronting net ends together.

In FIG. 1, a net jointing structure A has a pair of warp-knitted net adapters 10,10 attached to the confronting ends of a pair of nets 11,11 and having on and along their inner edges a pair of stringers 12,12 of a sliding clasp fastener 13 with rows 14,14 of elements or scoops mounted along the stringers being interengaged to joint the nets 11,11 together.

Figure 3:
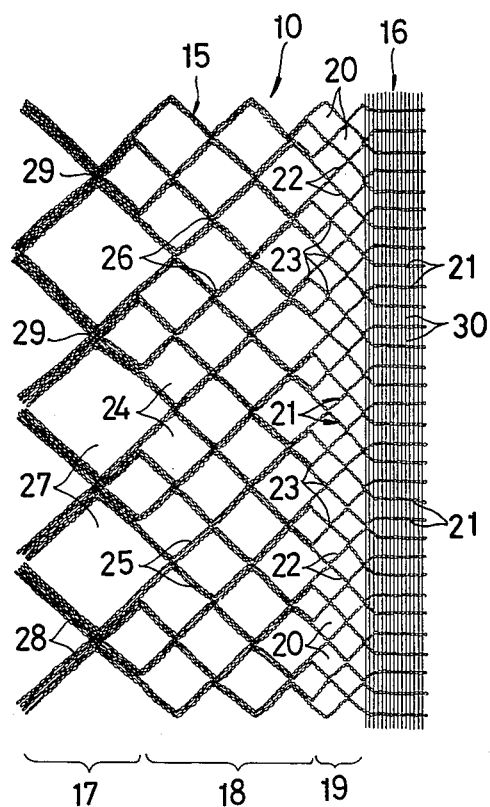
FIG. 3 is an enlarged plan view of one of the net jointing adapters shown in FIG. 1.

As shown in FIG. 3, each of the knitted net adapters 10 comprises a net region 15 for being connected to the end of the net 11 and a web region 16 for supporting the fastener stringer 12 thereon. The net region 15 is subdivided into a plurality of sections, three sections 17,18, and 19 in the illustrated embodiment, the net region being progressively smaller in mesh size from the section 17 to the section 19. The net section 19 of the smallest mesh size is integral along its one edge with the web region 16. The net section 19 is formed of a plurality of meshes 20 which in turn are made of a plurality of warp chains 21, each mesh having legs or sides 22. Each of the warp chains 21 is united to an adjacent warp chain at a junction point or "knot" 23. The net section 18 of an intermediate mesh size has a plurality of meshes 24 each having legs or sides 25 made of a plurality of paired warp chains 21. Each of the warp chain pairs is united to an adjacent warp chain pair at a junction or "knot" 26. The net section 17 of the largest mesh size has a plurality of meshes 27 each having legs of sides 28 made of a plurality of mated warp chain pairs each united to adjacent mated warp chain pairs at a junction or "knot" 29. The net sections may vary in number and size depending on applications where the net jointing structure A is to be used.

The web region 16 comprises a plurality of the warp chains 21 uniformly spaced from each other along the length of the region 16. Each of the warp chains 21 is an extension of one of the legs 22 of each mesh 20 of the net section 19, and extends trasversely of the web region 16. Inlaid threads 30 are included in the web region 16 and connect the warp chains coursewise together, the threads 30 being also laid in and along the warp chains 21 in the net region 15 to reinforce the legs 22,25 and 28, junctions 23,26 and 29, as will be described later on.

Figure 2:
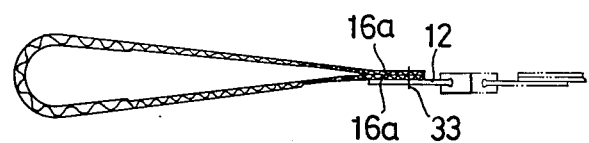
FIG. 2 is a cross-sectional view taken along line II—II of FIG. 1.
Figure 4:
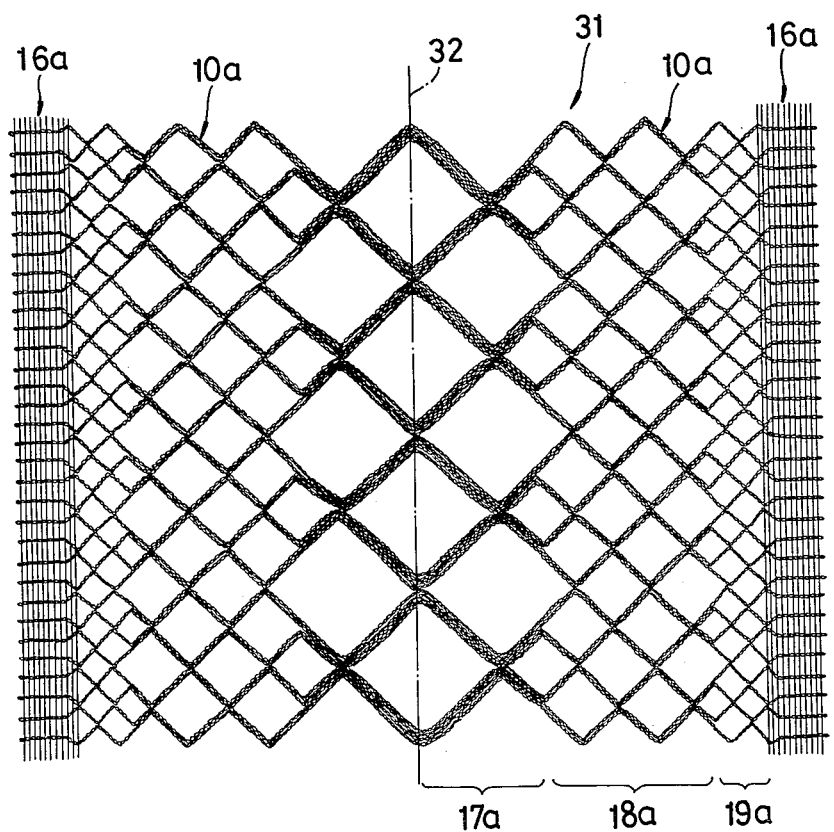
FIG. 4 is a plan view showing a knitted net structure to be folded on itself for forming the adapter shown in FIG. 2.

FIG. 4 illustrates a warp-knitted structure 31 having a pair of adapter halves 10a,10a symmetrically arranged with respect to a central line 32. The adapter 10 shown in FIG. 3 is obtained by folding the structure 31 on itself about the line 32 and getting the adapter halves 10a,10a into exactly overlapped relation with each other. As shown in FIG. 2, the sliding clasp fastener stringer 12 is fixed to one side of the overlapped web halves 16a,16a typically with sewn stitches 33. Alternatively, the fastener stringer 12 may be sandwiched between the web halves 16a,16a and sewn thereto. The knitted net adapter 10 with the fastener stringer 12 thus mounted is preferably tied by strings along the net section 17 to the end of the net 11 that has substantially the same mesh size as the largest mesh size of the net section 17. The scoop rows 14,14 can be engaged and disengaged by manipulating a usual slider (not shown) movable therealong. In applications where no excessive loads are expected, the adapter half 10a as a single-layer adapter can be used instead of the adapter 10 of the double-layer type.

Figure 5:
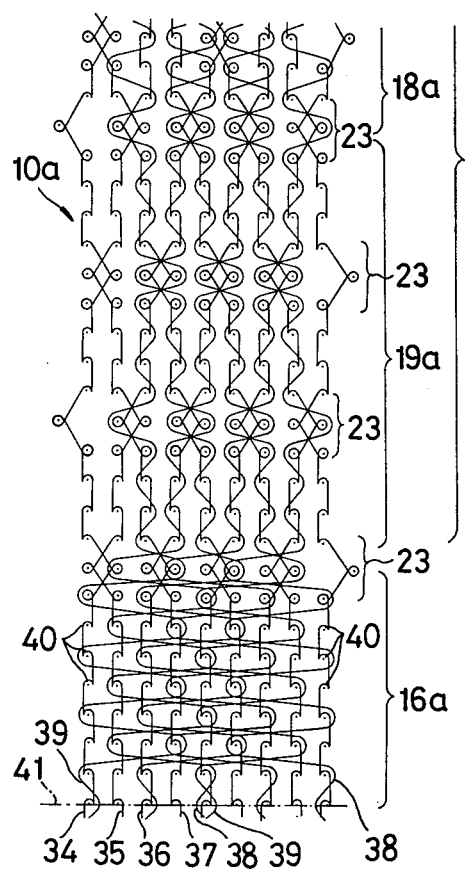
FIG. 5 is a stitch pattern on an enlarged scale for the knitted net adapter.
Figure 6:
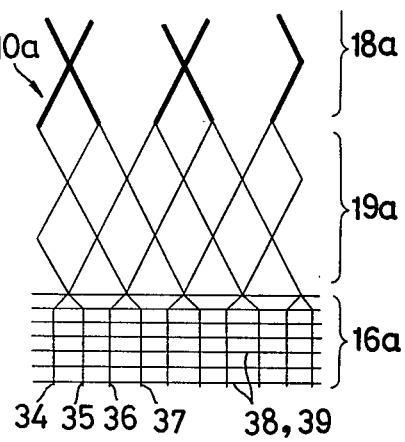
FIG. 6 is a diagramatic view of the knitted net adapter, which is employed here for facilitating the understanding of FIG. 5.

The structural details of the warp-knitted net adapter 10 will be described with reference to FIGS. 5 and 6. The knitted net structure is composed of four kinds of chain or pillar stitches 34,35,36, and 37 for forming the warp chains 21, and two kinds of inlaid yarn 38,39 for forming the threads 26. Thus, there are required a total of six guide bars, four for the chain stitches and two for the inlaid yarn. In the net region 15a, every adjacent ones of the chain stitches 34,35,36, and 37 are interknitted with each other to provide the junction points 23. For example, the chain stitch 35 is interknitted with the chain stitch 34 at the first junction 23, with the chain stitch 36 at the second junction 23, and again with the chain stitch 34 at the third junction 23, to thereby provide the legs 22. The guide bars for the two kinds of inlaid yarn 38,39 are threaded through their every other guide holes which are in warpwise alignment. The guide bars for the inlaid yarn lap symmetrically in opposition during the machine operation for producing the web region half 16a. In the web region half 16a, the inlaid yarn 38 extends transversely or coursewise across and over four wales of the chain stitches, and similarly the inlaid yarn 39 extends transversely or coursewise across and over four wales of the chain stitches. Each warp chain 21 in the web region half 16a has every other loops 40 wrapped or looped by the two kinds of inlaid yarn 38,39 that keep the loops 40 under tension in opposite directions.

In the net section 19a, each inlaid yarn extends in and along one of the warp chains and is interlaced with adjacent ones at the junctions 23. The two kinds of inlaid yarn 38,39 are interlaced throughout the net sections 18a,17a and enable the adjacent chain stitches to be tied together, thus combining warp chains 21 in the net sections 18a,17a. In FIG. 5, some of the inlaid yarn are omitted for the clarity of illustration.

Since the adapter knit fabric is made preferably of synthetic resin such as polyester, the web region half 16a can be cut with heat along a line 41, in which case the cut edge isprevented from unraveling.

The two kinds of inlaid yarn 38,39 provide each warp chain with equalized positional stability, thereby enabling the wrap chains 21 to be spaced at regular intervals within the web region 16. Furthermore, since the intervals at which the warp chains 21 are spaced are extremely small, the warp chains 21 areclose to each other to thereby render the web region 16 compact and rigid enough to support a fastener stringer thereon with a required degree of stability.

With the adapter 10 thus constructed, any deformation produced along the web region 16 can be reduced to a minimum when the adapter net is held under tension in a direction perpendicular to the web region 16. Therefore, the sliding clasp fastener stringer 12 mounted on the web region 16 is prevented from getting wavy, puckered or otherwise deformed, with the results that the sliding clasp fastener 13 can be retained stably in place and be manipulated reliably over a long period of time. Furthermore, the web region 16 thus made compact permits the fastener stringer 12 to be sewn thereon to a nicety and with stability.

A further advantage resulting from the warp-knitted net adapter thus constructed is that the sliding clasp fastener 13 can be additionally protected against deformation or damage under the influence of severe forces because such forces when applied on the net 11 are taken up and distributed uniformly over the entire length of the fastener 13 by means of the net region 15 having varying mesh sizes.

It should be understood that the present invention is not limited to the specific details of construction and arrangement thereof therein illustrated and that changes and modifications may occur to one skilled in the art without departing from the scope of the appended claims.

I claim as my invention:

1. A net jointing structure for jointing net ends together along a given junction line, comprising: a pair of adapters of warp-knitted net structure each having a net region and a web region, said net region being subdivided into a plurality of net sections one of which is smaller in mesh size than another and formed of a plurality of meshes made of warp chains, extending along respective lines generally diagonal to said junction line, said one net section being integral with said web region, said another net section of a larger mesh size being connectable to one of the net ends, said web region including a plurality of warp chains extending generally perpendicular to said junction line and spaced from each other along the length of the web region, said warp chains in the web region forming wales of warp chains and being extensions of said warp chains in said net section, said web region further including inlaid yarns each extending over a plurality of wales, each of said warp chains having alternate loops interlaced jointly by a selected pair of said inlaid yarns which extend in opposite directions symmetrically with respect to said each of said warp chains, whereby said warp chains in the web region are kept by said inlaid yarns in uniformly spaced-apart relation to each other, and said inlaid yarn extending into and along said warp chains in the net region; and a sliding clasp fastener having a pair of stringers fixed to said web regions for coupling and uncoupling said adapters along said junction line.

* * * * *